United States Patent [19]

Haralambou

[11] 4,106,191
[45] Aug. 15, 1978

[54] COMBINATION HEDGE TRIMMER AND CLIPPINGS COLLECTOR

[76] Inventor: Larry A. Haralambou, 299 Horseblock Rd., Farmingville, N.Y. 11738

[21] Appl. No.: 803,550

[22] Filed: Jun. 6, 1977

[51] Int. Cl.² .................................................. B26B 19/38
[52] U.S. Cl. ........................................... 30/132; 56/194
[58] Field of Search .................... 30/132, 133, 233; 56/17.4, 194, 233

[56] References Cited

U.S. PATENT DOCUMENTS

| | | | |
|---|---|---|---|
| 2,281,189 | 4/1942 | Wright | 30/132 |
| 2,515,343 | 7/1950 | Gravely | 56/194 X |
| 2,641,100 | 6/1953 | Sylvester | 56/194 X |
| 3,981,077 | 9/1976 | Manabe et al. | 30/233 |

Primary Examiner—Jimmy C. Peters
Attorney, Agent, or Firm—Kirschstein, Kirschstein, Ottinger, Frank & Cobrin

[57] ABSTRACT

A portable device for trimming hedges, shrubs and trees, cutting grass etc. in which an integral clippings collector is provided. The device features a hedge trimmer consisting of reciprocating blades, a generally cylindrical rotatable brush juxtaposed with the hedge trimmer, and a baffle so disposed in relation to the hedge trimmer and brush that severed portions of the vegetation are directed to an enclosure in which the severed portions are collected. In a preferred embodiment the enclosure may be periodically emptied of accumulated vegetation by pivoting a panel portion of the enclosure about one edge thereof.

17 Claims, 10 Drawing Figures

COMBINATION HEDGE TRIMMER AND CLIPPINGS COLLECTOR

BACKGROUND OF THE INVENTION

1. Field of the Invention

A portable device for both trimming vegetation and for concomitantly collecting the resultant clippings.

2. Description of the Prior Art

Most commercial portable hedge and shrub trimmers are not furnished with an integral clippings collector. Such appurtenances are common however in the case of lawn mowers such as the well known rotary power mowers. In this case a simple catch bag is provided behind the mower, with the grass clippings simply being flung, thrown or pushed into the bag.

The advantages of providing an integral clippings collector in conjunction with a portable hedge and shrub trimmer are numerous, and the prior art has suggested several configurations of feasible clippings collectors.

Among the pertinent prior art in this field may be mentioned U.S. Pat. Nos. 3,916,521; 3,795,050; 3,552,013; 3,073,025; 2,747,276; 2,281,189; and 1,833,246; and British Pat. Nos. 632,539 and 618,339. These prior art patents generally provide bulky and heavy configurations, albeit portability is contemplated. Generally there is nothing to prevent clippings from falling back out of the devices if they are tipped forwards. In this case, the clippings will fly out of the device due to brush action and will be widely scattered and dispersed. Generally these prior art devices are not amenable to cutting the sides of hedges or shrubs, and they are heavy in weight which necessitates the provision of straps etc. for mounting the device on the person of the operator, rather than being truly lightweight enough to be completely portable.

SUMMARY OF THE INVENTION

Purposes of the Invention

It is an object of the present invention to provide an improved combination hedge trimmer and clippings collector.

Another object is to prevent severed vegetation from being dispersed onto the ground, or onto hedges or shrubs or the like, when being cut with a hedge trimmer.

A further object is to provide a lightweight portable hedge trimmer and clippings collector.

An additional object is to provide an improved hedge trimmer with integral clippings collector.

Still another object is to provide a hedge trimmer and clippings collector in which the jamming or clogging of the device due to accumulation of clippings is effectively prevented.

Still a further object is to provide a hedge trimmer and clippings collector which may be operated at an angle to the horizontal plane without having collected clippings fall out of the device or back onto the hedge trimmer blades.

Still an additional object is to provide a hedge trimmer and clippings collector which may be tipped forwards, or inclined rearwards, or employed in a sideways vertical orientation to cut the sides of hedges, shrubs or the like, without having accumulated clippings fall out of the clippings collector section of the device.

An object is to provide a hedge trimmer and clippings collector in which clippings are immediately and permanently removed and separated from the hedge trimmer portion of the device.

An object of the invention is to provide an improved device for the trimming or cutting of leaves, twigs, vines, excessive growth, branches, blades or shoots from hedges, shrubs; grass and/or weeds growth such as in parks, lawns, farms or cemeteries; or from trees, bushes and the like vegetation.

These and other objects and advantages of the present invention will become evident from the description which follows.

Brief Description of the Invention

Within the context of the present invention, the term hedge trimmer will be understood to encompass and include a mechanical device provided with a plurality of juxtaposed blades, for the trimming or cutting of leaves, twigs, vines, branches, shoots, or any form of excessive growth of vegetation, from hedges, shrubs, bushes, trees, or from grass and/or weeds growth, such as in parks, lawns, farms, cemeteries, or about and around private homes and other dwellings.

In the present invention, a combination hedge trimmer and clippings collector is provided which includes a generally linear, i.e. straight, slightly curved, arcuate or C-shaped, hedge trimmer portion. The hedge trimmer portion in any case consists essentially of a plurality of juxtaposed blades together with means to reciprocate the blades. Although reciprocation per se of the blades is the usual practice in hedge trimmer specification and design, within the context of the present invention reciprocation will be understood to encompass and include not only conventional opposed shearing movement of adjacent blades relative to each other, but also a chain saw type of motion of the blades, i.e., in a continuous looped path. In any event, the blades are movable relative to stationary vegetation so that at least a portion of the vegetation may be severed from connection to ground. In most instances, gaps between the teeth or blades of the hedge trimmer grab and pull branches or other vegetation into cutting grooves. Typically the blade is a single or double edged toothed blade of alloy steel which provides thousands of cuts per minute. The blade or blades are driven in most instances by an electric motor which receives power from ordinary house current (cord-type) or from rechargeable batteries (cordless type).

The present device further includes a generally cylindrical brush which is of any generally cylindrical configuration, e.g. a plurality of parallel liner, spiral or circular rows of tufts of bristles which extend outwards from an inner attachment to a rigid support such as a metal pipe or cylinder. In any case the brush is rotatable about its central axis so that the tufts describe circular paths and a cylindrical sweeping action is attained. The central axis of the brush means is oriented substantially parallel to the hedge trimmer.

In accordance with the present invention, a baffle of specific orientation relative to the balance of the elements in the device is provided. One edge of the baffle is juxtaposed with the hedge trimmer, and the baffle is disposed about a portion of the circular path of motion of the terminal ends of the brush means, so that these terminal ends of the tufts of the brush means are contiguous with the baffle during a portion of the rotation of the brush means.

An enclosure is provided about and extending from the terminus of the baffle, such terminus being spaced away from the hedge trimmer portion of the device. Thus the severed portion of the vegetation is directed by the brush means to a disposition first adjacent to, and then contiguous with, the aforementioned baffle. Thereafter, the severed portion of the vegetation is discharged by the brush means from juxtaposition with the baffle and into the enclosure, wherein the successive clippings, i.e. severed portions of the vegetation, are accumulated.

The device is completed in its broadest embodiment by the provision of suitable means to periodically remove accumulated severed portions of the vegetation from the enclosure, as well as by the provision of suitable means to manipulate the hedge trimmer so that the plurality of juxtaposed blades are brought in contact with further portions of stationary vegetation to be severed from connection to ground.

The brush means generally will consist of a plurality of juxtaposed tufts, each of such tufts consisting of a plurality of contiguous linear bristles, fibers or strands, with the tufts extending radially outwards from the central axis of the brush means as mentioned supra. However, the brush means may alternatively consist of any type of cylindrical brush configuration, e.g. one in which the individual tufts or bristles are mounted on a plurality of parallel linear slats or holders which are spaced apart and oriented so as to define a cylindrical configuration, with the slats being attached by rods or the like to a central shaft or axle which in turn is rotated by suitable driving means.

The hedge trimmer in a preferred embodiment will consist of at least two rows of blades, with the blades in each row being spaced apart from each other, and with the two rows of blades being contiguous. Reciprocating motion of one row of blades relative to the next in this case provides the cutting action. In most instances the hedge trimmer will be of straight line form, however other configurations such as a slightly bowed, curved or arcuate linear hedge trimmer may be employed, in which case the vegetation being trimmed or cut would be urged inwards into the blades or teeth area, the center of the hedge trimmer in this case being rearwards of the path of cutting action.

Any suitable means to rotate the brush means about its central axis may be provided, however typically such rotation means includes a motor and a shaft, with the motor rotating the shaft and the shaft extending from the motor to connection with the central axis of the brush means. The shaft will usually be a rigid member of straight line form, and in this case the shaft will be coaxial with the central axis of the brush means. However, alternatively the drive shaft may be a flexible linear shaft within an annular casing, with the flexible linear shaft being curved to accommodate for the relative dispositions of the motor and brush means.

The enclosure may be of any suitable configuration to accommodate the terminal dimension of the baffle and the path of travel of the severed portions of vegetation, however preferably the enclosure is of generally rectangular parallelpiped form. Typically the enclosure is provided with a movable panel, which when shut allows for the accumulation of clippings, i.e. severed portions of vegetation, and which when open permits the dumping of accumulated clippings of severed portions of vegetation into a trash bin or can or for other suitable disposal of the clippings, which clippings in some instances of home gardening will be added to a compost heap or pile. The movable panel may be slidably adjustable in grooves to alternate open and shut position, however in a preferred embodiment the movable panel is adjustable to alternate open and shut positions by the provision of suitable means to manually pivot the movable panel about one edge thereof.

A unique configuration of means to pivot the movable panel about one edge thereof contemplated in the present invention entails the provision of an angular handle, which handle is mounted on the enclosure with the inner portion of the handle being partially rotatable about its central axis. The handle extends from within the enclosure to external means for manipulation of the handle. A lever is also provided, which lever extends laterally from the end of the handle within the enclosure. Finally, a rod is provided. One end of the rod is pivotally attached to the outer end of the lever, and the other end of the rod is pivotally attached to the movable panel, so that partial rotation of the handle causes the lever to displace the rod, the rod thereby pivoting the movable panel about its edge.

The aforementioned handle will preferably be right angled, with the inner portion of the handle being perpendicular to and extending through a planar wall of the enclosure and with the outer portion of the handle being parallel to the wall of the enclosure and provided with staggered serrations, bumps or ridges for easy manipulation by the user.

In a preferred embodiment, and in order to stabilize the movable panel in the closed position while still permitting easy manipulation of the movable panel to the opened position as a temporary expedient for periodic disposal of accumulated clippings, suitable spring means are provided external to the enclosure and in conjunction with the handle, to bias the handle away from the enclosure. At least one roller and detent means within the enclosure are provided in conjunction with the spring means. The roller extends laterally from the handle and is in contact with the detent means. The detent means extends about at least a portion of the handle and is attached to the inner wall of the enclosure, so that the handle is maintained in a fixed position, with the movable panel in shut position, by the roller mating with the detent means, except during periodic dumping of accumulated clippings, at which time the handle is concomitantly manually depressed into the enclosure and then is partially rotated, so as to pivot the movable panel about its edge.

The movable panel is preferably rectangular so as to conform to the preferred rectangular parallelepiped configuration of the enclosure, and in this regard the movable panel may be and extend over all or a portion of a wall or walls of the enclosure. As will appear infra, this wall may be either a top wall, a side wall or a rear wall of the enclosure. Any of these configurations and orientations of discharge movable panel will work satisfactorily. The top discharge offers the least chance of damaging the movable panel, which is comparable to a door, when emptying the clippings into a trash can or the like. The rear discharge is the most convenient, but is also the most susceptible to damage. The side discharge is also highly susceptible to damage. Thus the main and most feasible orientation of the movable panel is as a top discharge door.

A portion of the enclosure is preferably foraminous, i.e., all or a portion of one or more walls of the enclosure may be provided with perforations or an integral wire mesh screen or the like, so that air may escape from within the enclosure as the quantity of severed vegetation portions or clipping increases within the enclosure. Thus air pressure within the enclosure which could inhibit the action and movement of the brush means is prevented.

The baffle is preferably slightly arcuate so as to conform to the circular path of motion of the ends of the tufts or bristles of the brush means, however a flat planar baffle may alternatively be provided for reasons of simplicity, lower cost and ease of assembly. However in most instances arcuate, i.e. curved, bowed or otherwise configured baffle will be provided so as to conform to the cylindrical configuration of the brush means and thereby to rapidly and completely direct clippings to the enclosure without the accumulation of clippings at the interface between the brush means and the baffle or at the terminal end of the baffle.

In most instances, the means to reciprocate the cutter blades of the hedge trimmer, and the means to rotate the brush means about its central axis, extend from a common power generation means such as the electric motor or the like mentioned supra. However, it is evident that it is also feasible, and may prove desirable in some instances, to provide a separate individual drive means for the reciprocation of the blades, and a separate individual drive means for rotation of the brush means.

The present combination hedge trimmer and clippings collector provides several salient advantages. One salient advantage is that the clippings are caught and collected in situ, so that the clippings are not scattered about adjacent to the hedge or shrub. Thus the clippings, which if left ungathered would soon age and wither to an unsightly brown color, are collected before they fall into the hedge or shrub or onto the ground, and the necessity of tedious raking around the hedge or shrub, or the shaking of the hedge or shrub to dislodge clippings, is obviated. Another desirable attribute of the present integral clippings collector is that the branches and/or stems, and leaves, when cut, cannot fall back into the cutting blades or associated mechanism, and hence the likelihood of the apparatus clogging or jamming due to a bulky accumulation of severed vegetation is eliminated. The present device is lightweight and is truly portable, and may be operated at an angle to the horizontal plane without having collected clippings fall out of the device or back onto the hedge trimmer blades. Thus the present hedge trimmer and clippings collector, during operation, may be tippd forwards, or inclined rearwards, or employed in a sideways vertical orientation to cut the sides of hedges, shrubs or the like, without having accumulated clippings fall out of the clippings collector enclosure section of the device, since the clippings are immediately and permanently removed and separated from the hedge trimmer portion of the device. Finally, the present device is of low cost and is relatively simple and easy to fabricate, assemble and market, since the present device does not entail the provision of complex or costly parts, structure and appurtenances.

The invention accordingly consists in the features of construction, combination of elements and arrangement of parts which will be exemplified in the device hereinafter described and of which the scope of application will be indicated in the appended claims.

BRIEF DESCRIPTION OF THE DRAWINGS

In the accompanying drawings in which are shown several of the various possible embodiments of the invention.

DETAILED DESCRIPTION OF THE PREFERRED EMBODIMENTS

Figures 1, 2:
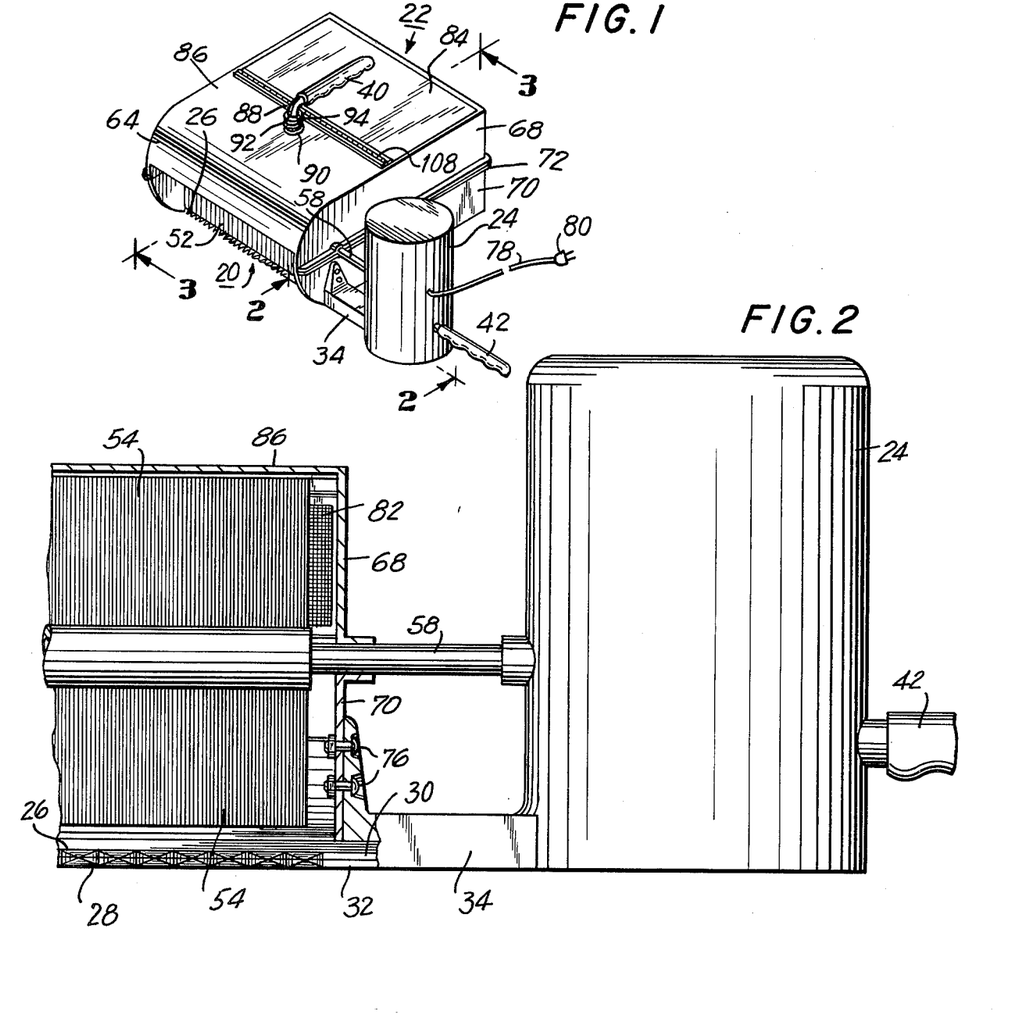
FIG. 1 is an overall perspective view of one embodiment of the device.
FIG. 2 is a sectional elevation view of a portion of the device, taken substantially along the line 2—2 of FIG. 1.
Figure 3:
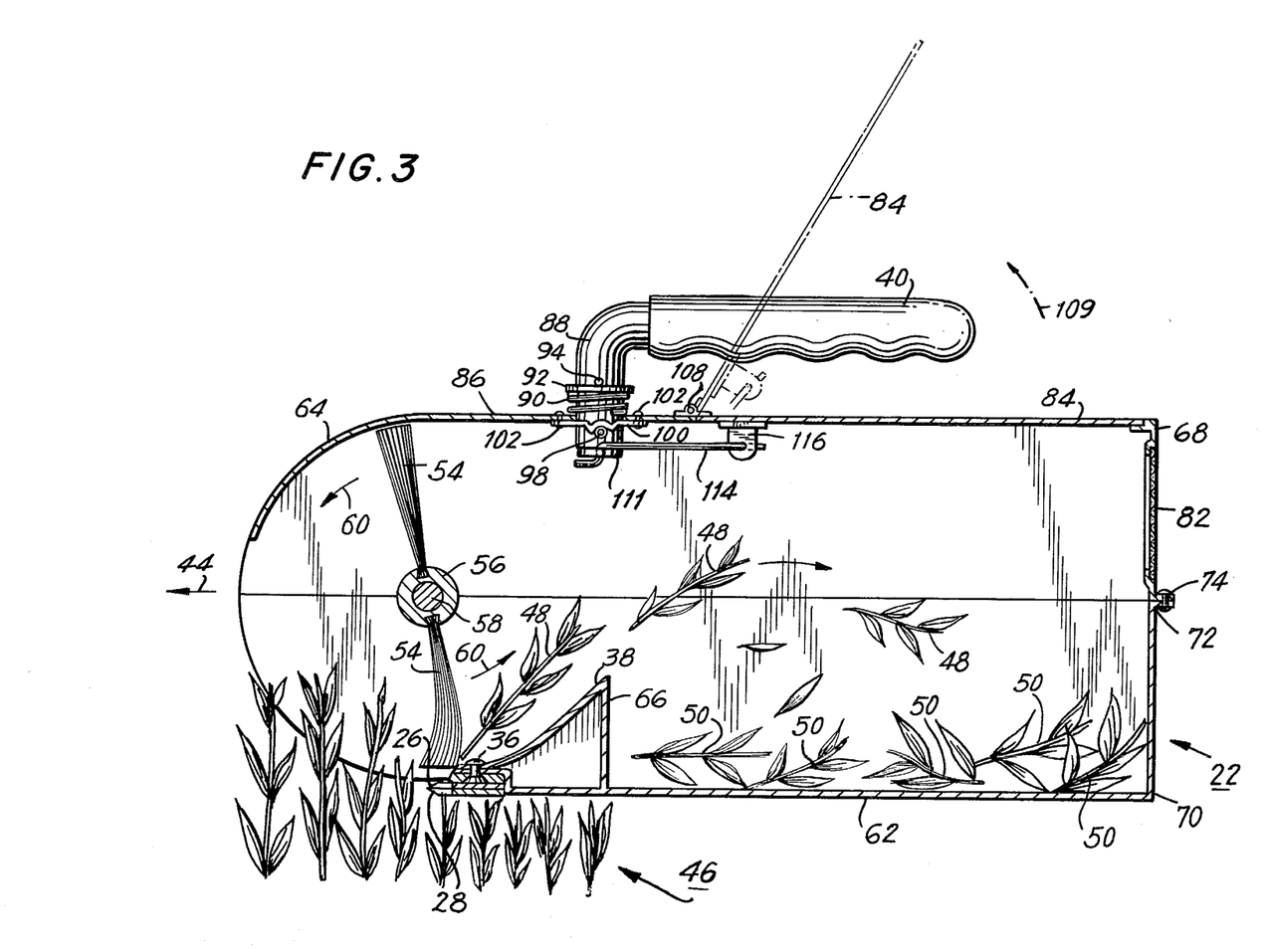
FIG. 3 is a sectional elevation view of the device taken substantially along the line 3—3 of FIG. 1.
Figure 4:
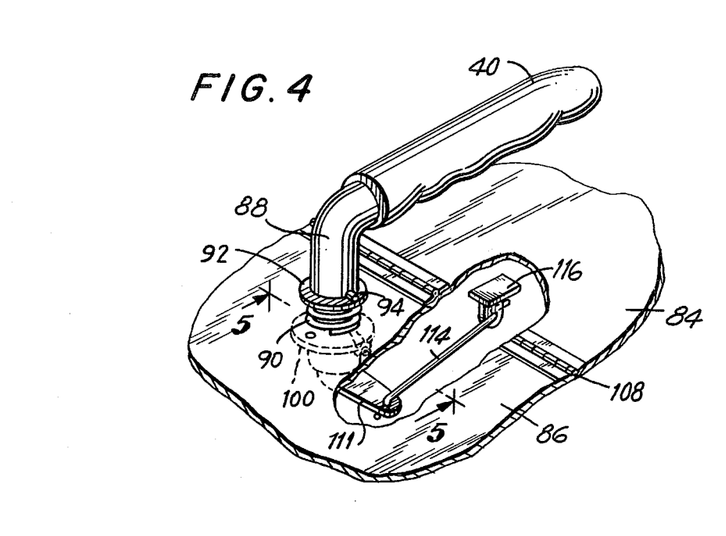
FIG. 4 is a perspective view of the handle and appurtenances thereto.
Figure 5:
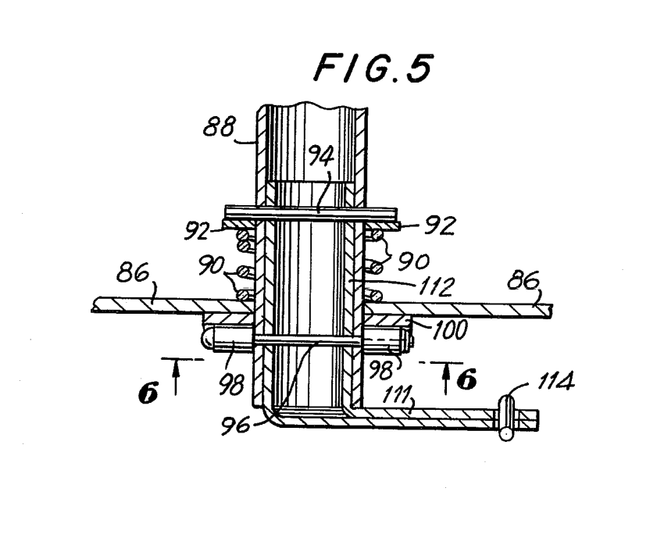
FIG. 5 is a sectional elevation view taken substantially along the line 5—5 of FIG. 4.
Figure 6:
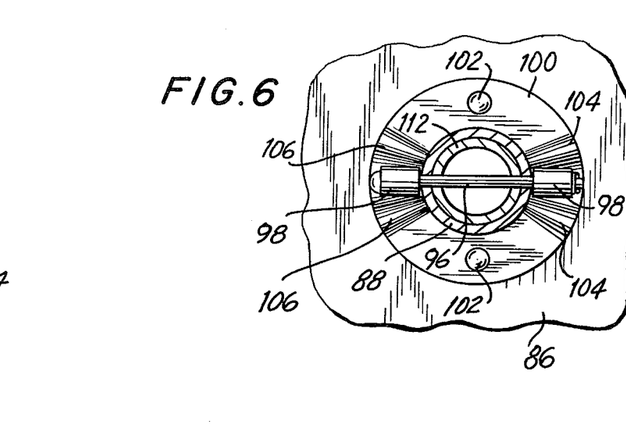
FIG. 6 is a bottom plan view taken substantially along the line 6—6 of FIG. 5.

Referring now to FIGS. 1, 2 and 3, the device is generally characterized by the provision of a hedge trimmer section 20, a clippings collector enclosure section 22, and a motor 24 to provide motive power for the device. The hedge trimmer section 20, as best shown in FIGS. 2 and 3, is provided with two rows 26 and 28 of reciprocating blades or teeth, mounted respectively in juxtaposition, so as to exert a cutting or shearing action, on stationary straight linear frame 30 and movable straight linear frame 32, which frame 32 is reciprocated by connection 34 and gearing, not shown, to motor 24. The upper stationary frame 30 is attached via bolting such as 36 (FIG. 3) to stationary parts of the framework of the device, in this case to a stationary baffle 38 furnished in accordance with the present invention. It will be evident that both frames 30 and 32 may be reciprocated in successive cyclic opposite directions by motor 24, if so desired.

The device is grasped by knobbed or knurled handles 40 and 42. Forwards manual manipulative movement of the device, as indicated by the arrow 44, across and through vegetation 46 while the hedge trimmer blades 26 and 28 are reciprocating causes the severing of portions 48 of vegetation to take place, so that the severed portions 48 are no longer connected to ground. The severed portions or clippings 48 ultimately join a body of accumulated clippings 50 in the enclosure section 22 of the device as will appear infra.

The clippings 48 are initially swept upwards and away from the teeth or blades 26 by virtue of the provision of a generally cylindrical brush means 52, best seen in FIG. 3 as composed of a plurality of tufts or bristles 54 in clumps which radially extend outwards from a central annular longitudinal mounting 56 which in turn is driven by a central axle or shaft 58. The shaft 58 extends to motor 24, as best seen in FIG. 2, so that the motor 24 provides motive power for both rotation of the bristles 54 and reciprocating movement of teeth or blades 28.

The direction of rotation of the bristles 54 is indicated by arrows 60 (FIG. 3). This counterclockwise rotation of the bristles 54 serves to sweep the clippings 48 upwards and rearwards above baffle 38, and thereafter the momentum of the clippings 48 causes them to lodge with the accumulated clippings 50. As best seen in FIG. 3, the baffle 38 is slightly arcuate in this embodiment of the invention, so as to accommodate for the circular path of travel of the terminal ends of the bristles 54.

Thus the clippings 50 lodge and accumuate on the lower wall or floor 62 of the enclosure 22, which as shown is a rectangular parallelepiped container extending rearwards from a curved front panel section 64 which is provided as a guard means to prevent inadvertnet extension of limbs such as a hand or an arm of the user into the moving parts of the device, which could cause injury to the person. The floor 62 of the container 22 also extends rearwards from a stiffening panel 66 which depends from the terminal end of baffle 38 so as to provide structural rigidity to the baffle 38. The boxlike configuration of section 22 is preferably obtained by the provision of upper and lower opposed halves, sections 68 and 70, which are joined at a flanged interface 72 by bolts such as bolt 74 (FIG. 3). As shown in FIG. 2, bolting 76 secures connector beam 34 to the framework of the hedge trimmer and clippings collector so that motor 24 is permanently attached to the device. Electric power to drive the motor 24, which in this embodiment of the invention is an electric motor, is furnished by cord 78 which extends to a terminal plug 80 which is inserted into a socket or other electrical outlet, not shown.

A wire mesh screen 82 is mounted in and forms part of the rear wall of upper container portion 68 so as to permit the egress of air from the interior of the device. Air pressure buildup within the enclosure, both from accumulation of clippings 50 and from the rotary motion of the bristles 54 of the brush means 52, is thus effectively prevented. Such air pressure buildup could act as an impediment to free rotary motion of the bristles 54 and thus as a drag and extra burden on the motor 24, as well as impeding free flow and motion of the cuttings or clippings 48 towards the rear of the enclosure.

Figure 7:
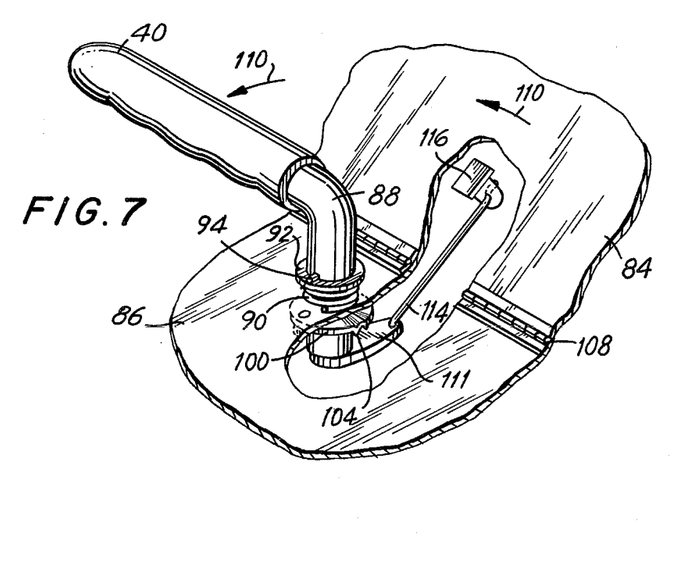
FIG. 7 is a perspective view of the handle similar to FIG. 4 but showing movement, i.e. rotation, of the handle so as to open the movable panel by a pivoting of the movable panel about one edge thereof.

Referring now to the handle 40, and as best seen in FIGS. 3-7, in this embodiment of the invention, structure is provided to restrain a movable top panel 84 in a closed position during operation of the device to cut vegetation as shown in FIG. 3, while allowing for periodic pivotal displacement of the panel 84, as shown in phantom outline in FIG. 3, and also as shown in FIG. 7, to permit opening of the enclosure or container 22 so that accumulated clippings 50 may be removed from the device by inverting or tipping the unit thereby dumping the clippings 50 for suitable disposal as described supra.

The handle 40 is mounted in front section 86 of top portion 68 of the enclosure 22 in such a manner as to permit restrained partial rotation of the dependent front portion 88 of the handle 40, which portion 88 extends at a right angle to the horizontal portion of handle 40 which is grasped by the hand of the user, and as shown in FIG. 3, portion 88 extends vertically downwards through section 86 and into the interior of the enclosure. A spring 90 circumscribes the portion 88 immediately external to section 86, and the spring 90 is maintained under compression by the provision of an upper circular ring 92 about portion 88, which ring 92 is restrained from moving away from section 86 by pin 94. Upwards motion of the entire handle assemblage away from the interior of the enclosure 22 is prevented by the provision of a lower pin 96 (FIGS. 5 and 6) which extends laterally through portion 88 to terminal rollers or roller bearings 98. Since the spring 90 is under compression, rollers 98 are urged upwards against circular plate 100 which is fastened to the underside of section 86 by bolts 102 and which is provided with detents 104 and 106. Thus the handle section or portion 88 is urged upwards by the spring 90 so that the rollers 98 tend to remain seated in detents 104 and 106, and the handle is restrained from any motion, in particular from partial rotational movement, unless and until downwards force is exerted against the handle 40 and/or concomitantly twisting force is exerted by the hand of the user. This is only done when dumping of accumulated clippings 50 is to take place, by the pivoting of panel 84 about one edge defined by hinge 108, as shown in FIG. 7 and in phantom outline in FIG. 3. The pivotal motion of panel 84 at this time is indicated by arrow 109 (FIG. 3) and the concomitant partial rotational motion of handle 40 and especially section 88 is indicated by arrows 110 (FIG. 7).

In order to accomplish these motions, a lever 111 depends laterally from the lower and inner terminus of the handle portion 88. The lever 110 is secured to handle portion 88 by an inner sleeve 112 which extends upward concentrically within and contiguous to the lower part of portion 88 and which is secured in place by virtue of the pins 94 and 96 extending through opposed holes in both elements 88 and 112, see especially FIG. 5. A rod 114 is swiveledly or pivotally attached at one end to the outer end of the lever 111, and the other end of the rod 114 is swiveledly or pivotally attached to a fitting 116 which is secued to the lower surface of the movable panel 84. Thus the coaction of the handle portion 88, lever 111 and rod 114 serves to pivot panel 84 about hinge 108 when handle 40 is grasped and manipulatively partially rotated from the position shown in FIG. 4 to that of FIG. 7, as indicated by arrows 110. When this happens, the rollers 98 leave the detents 104 and 106 and assume positions juxtaposed with bolts 102. It will be understood as mentioned supra that during normal operating periods of the device, i.e. unless accumulated clippings 50 are being dumped, the handle 40 is in the position shown in FIG. 4 and the detents 104 and 106 serve to restrain the handle 40 against inadvertent or accidental rotation and thus accidental opening of the enclosure via pivoting of panel 84 about hinge 108 is effectively prevented, which is important since the device as discussed supra is intended to be used in a variety of dispositions, e.g. inclined forwards, backwards or sideways, in which case accidental opening of the enclosure and premature spillage of the accumulated clippings 50 onto the ground or onto the vegetation being trimmed or cut is effectively prevented.

Figure 8:
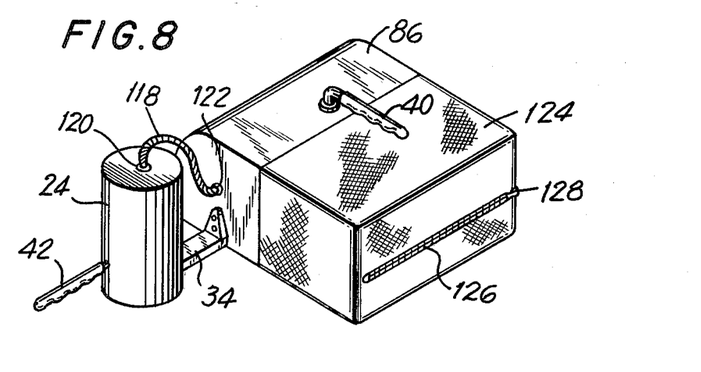
FIG. 8 is a perspective view of an alternative embodiment of the present device.

FIG. 8 shows an alternative configuration of the hedge trimmer and clippings collector in which the means to rotate the brush means is a flexible linear shaft within an annular casing 118, which element 118, and also the flexible shaft disposed coaxially inside elements 118, are curved to accommodate mechanical power transfer from an upper outlet 120 of motor 24 to a side inlet 122 of the brush means portion of the device. FIG. 8 also shows an alternative configuration of the enclosure or container for clippings collection, namely an entirely foraminous cloth or wire screen or mesh rear section 124 provided with a back horizontal zipper means 126 which is periodically manipulated by sliding end slider 128 laterally so as to open the zippered section 124, so that accumulated clippings may be removed from the device. The rear section 124 in this embodiment is supported by an internal or external rigid framework, ribs, or webs composed of rigid linear stiffening or beam members, not shown.

Figure 9:
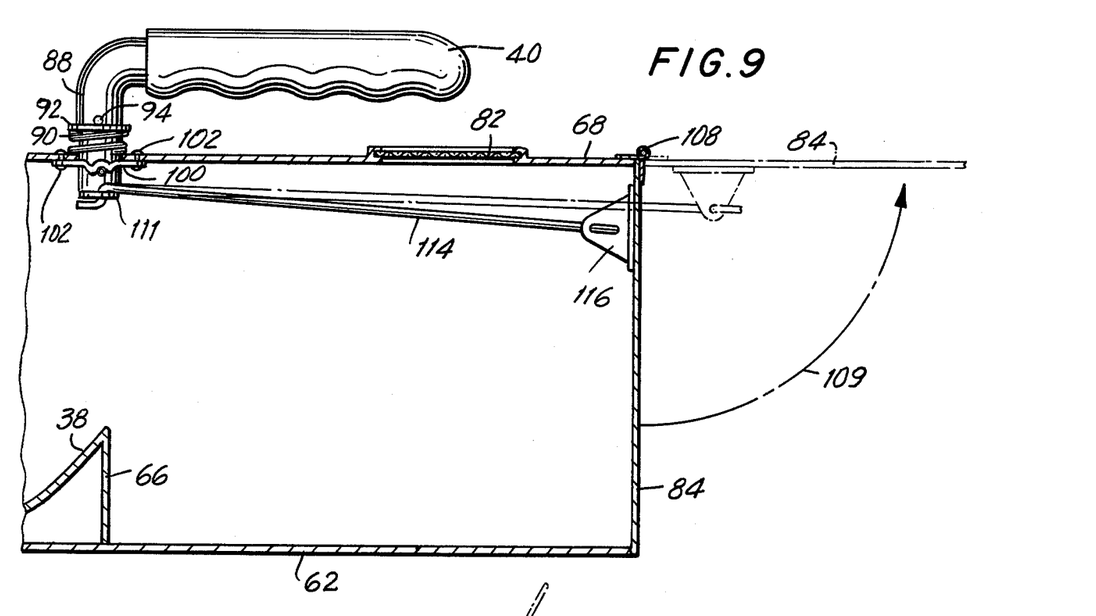
FIG. 9 is a sectional elevation view showing an alternative embodiment in which the movable panel opens from the rear wall of the device.
Figure 10:
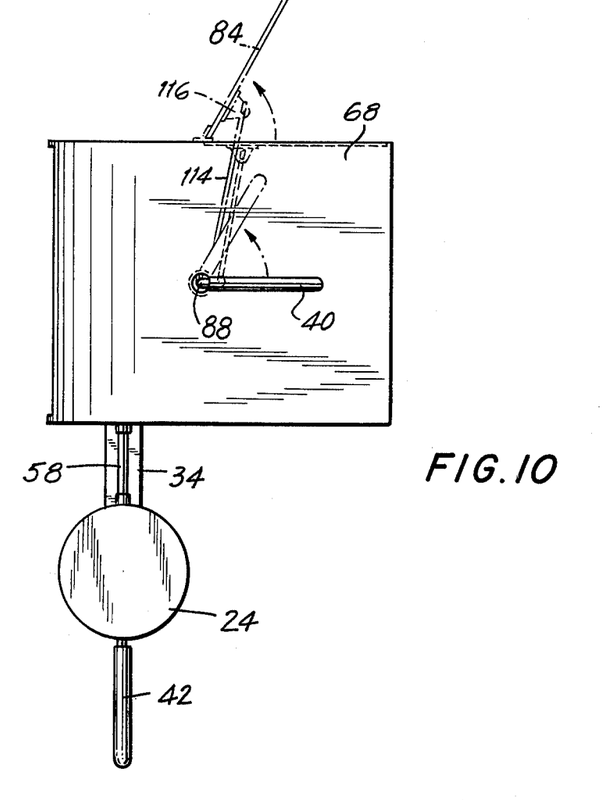
FIG. 10 is a plan view showing an alternative embodiment in which the movable panel opens from a side wall of the device.

FIG. 9 shows an alternative configuration in which the movable panel is disposed at the rear of the device as a rear wall. The foraminous screen 82 in this case is disposed in the top horizontal wall 68 of the device. FIG. 10 shows another alternative embodiment in which the movable panel is disposed as part of a side wall of the device. The disposition of the various appurtenances to acommodate for these configurations of FIGS. 9 and 10 is clearly evident.

It thus will be seen that there is provided a device which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. A combination hedge trimmer and clippings collector which comprises a substantially linear hedge trimmer, said hedge trimmer consisting essentially of a plurality of juxtaposed blades together with means to reciprocate said blades, so that said blades are movable relative to stationary vegetation whereby at least a portion of the vegetation may be severed from connection to ground, a generally cylindrical brush means, the central axis of said brush means being substantially parallel to said hedge trimmer, means to rotate said brush means about said central axis, a baffle, one edge of said baffle being juxtaposed with said hedge trimmer, said baffle being disposed about a portion of the circular path of motion of the terminal ends of said brush means so that said terminal ends are contiguous with said baffle during a portion of the rotation of said brush means, an enclosure about and extending from the terminus of said baffle, so that said severed portion of the vegetation is directed by said brush means to a disposition first adjacent to and then contiguous with said baffle and thereafter said severed portion of the vegetation is discharged by said brush means from juxtaposition with said baffle and into said enclosure, means to periodically remove severed portions of the vegetation from said enclosure, and means to manipulate said hedge trimmer so that said plurality of juxtaposed blades are brought in contact with further portions of stationary vegetation.

2. The combination hedge trimmer and clippings collector of claim 1 in which the brush means comprises a plurality of juxtaposed tufts, each of said tufts comprising a plurality of contiguous linear bristles, said tufts extending radially outwards from the central axis of the brush means.

3. The combination hedge trimmer and clippings collector of claim 1 in which the hedge trimmer comprises at least two rows of blades, the blades in each row being spaced apart from each other, said two rows of blades being contiguous.

4. The combination hedge trimmer and clippings collector of claim 1 in which said hedge trimmer is of straight line form.

5. The combination hedge trimmer and clippings collector of claim 1 in which the means to rotate the brush means about its central axis comprises a motor and a shaft, said motor serving to rotate said shaft, said shaft extending from said motor to connection with the central axis of the brush means.

6. The combination hedge trimmer and clippings collector of claim 5 in which the shaft is of straight line form and is coaxial with the central axis of the brush means.

7. The combination hedge trimmer and clippings collector of claim 5 in which the shaft is a flexible linear shaft within an annular casing, said flexible linear shaft being curved.

8. The combination hedge trimmer and clippings collector of claim 1 in which the enclosure is of generally rectangular parallelepiped form.

9. The combination hedge trimmer and clippings collector of claim 1 in which the enclosure is provided with a movable panel so that the enclosure may be periodically emptied of severed portions of the vegetation.

10. The combination hedge trimmer and clippings collector of claim 9 in which the movable panel is adjustable to alternate open and shut positions by the provision of means to pivot the movable panel about one edge thereof.

11. The combination hedge trimmer and clippings collector of claim 10 in which the means to pivot the movable panel about one edge thereof comprises an angular handle, said handle being mounted on the enclosure and the inner portion of said handle being partially rotatable about its central axis, said handle extending from within the enclosure to external means for manipulation of said handle, a lever, said lever depending laterally from the end of said handle within the enclosure, and a rod, one end of said rod being pivotally attached to the outer end of said lever, the other end of said rod being pivotally attached to the movable panel, so that partial rotation of said handle causes said lever to displace said rod, said rod thereby pivoting the movable panel about one edge thereof.

12. The combination hedge trimmer and clippings collector of claim 11 in which the handle is right angled.

13. The combination hedge trimmer and clippings collector of claim 11 in which spring means are provided external to the enclosure and in conjunction with the handle, to bias the handle away from the enclosure, together with at least one roller and detent means within the enclosure, said roller extending laterally from the handle and being in contact with said detent means, said detent means extending about at least a portion of the handle and being attached to the inner wall of the enclosure, so that the handle is maintained in a fixed position, with the movable panel in shut position, by said roller mating with said detent means, except when the handle is concomitantly depressed into the enclosure and is partially rotated.

14. The combination hedge trimmer and clippings collector of claim 9 in which the movable panel is rectangular.

15. The combination hedge trimmer and clippings collector of claim 1 in which a portion of the enclosure is formainous so that air may escape from within the enclosure as the quantity of severed vegetation portions within the enclosure increases.

16. The combination hedge trimmer and clippings collector of claim 1 in which the baffle is arcuate.

17. The combination hedge trimmer and clippings collector of claim 1 in which the means to reciprocate the blades and the means to rotate the brush means about its central axis extend from a common power generation means.

* * * * *